United States Patent [19]

Romano

[11] Patent Number: 5,510,409
[45] Date of Patent: Apr. 23, 1996

[54] FOAM CONTROL AGENTS FOR LATEX PAINTS

[75] Inventor: Andrew A. Romano, Sparta, N.J.

[73] Assignee: Ashland Inc., Columbus, Ohio

[21] Appl. No.: 143,002

[22] Filed: Oct. 26, 1993

[51] Int. Cl.$^6$ .............................. C08K 5/09; C08K 5/24; C08K 3/34; C08L 91/08
[52] U.S. Cl. .................... 524/322; 524/261; 524/265; 524/487; 524/493
[58] Field of Search .................................. 524/322, 493, 524/310, 275, 487, 261, 266, 265

[56] References Cited

U.S. PATENT DOCUMENTS

| | | | |
|---|---|---|---|
| 4,028,218 | 6/1977 | Fink et al. | 252/321 |
| 4,451,390 | 5/1984 | Flannigan | 251/321 |
| 4,732,694 | 3/1988 | Gowland et al. | 252/174.21 |
| 5,045,225 | 9/1991 | Aronson et al. | 252/174.15 |

*Primary Examiner*—Paul R. Michl
*Assistant Examiner*—LaVonda R. DeWitt
*Attorney, Agent, or Firm*—David L. Hedden

[57] ABSTRACT

This invention relates to foam control agents for latex paints. The foam control agents contain zero volatile organic constituents. The foam control agents comprise: (a) a vegetable oil; (b) a hydrophobic material; and (c) a silicone compound. The invention also relates to latex paints formulated with such foam control agents.

4 Claims, No Drawings

FOAM CONTROL AGENTS FOR LATEX PAINTS

FIELD OF THE INVENTION

This invention relates to foam control agents for latex paints. The foam control agents contain zero volatile organic compounds. The foam control agents comprise: (a) a vegetable oil, preferably soybean oil; (b) a hydrophobic material; and (c) a silicone compound. The invention also relates to latex paints formulated with such foam control agents.

BACKGROUND OF THE INVENTION

Latex paints are a mixture of several ingredients. Typically used in latex paints are water, a polymeric binder, coalescing aids, thickening aids, dispersants, foam control agents, biocides, and pigments.

The foam control agent is essential to the latex paint formulation. Without the foam control agent, bubbles will form in the latex paint and the coated substrate when the paint is applied to it. After the latex paint with the bubbles dries on the substrate, dried bubbles will appear on the substrate. These dried bubbles are not aesthetically pleasing. Furthermore, a substrate with dried bubbles is not effectively covered and protected from the environment.

Typically used in foam control agents for latex paints are a carrier, a hydrophobic material, and/or silicone. Typically used as the carrier in foam control agents are mineral oils and other volatile organic compounds (VOC).

Since the Clean Air Act was passed in 1977 there has been an interest in developing paints with lower levels of VOC. Although the act does not forbid the use of VOCs in architectural paints, it does limit the level of VOCs and there is still an interest in reducing the level of VOCs in paint.

SUMMARY OF THE INVENTION

The subject invention relates to foam control agents which comprise:

(1) a vegetable oil;
(2) a hydrophobic material; and
(3) a silicone compound.

Because the vegetable oil is used as a carrier, the foam control agents do not employ any VOCs.

The invention also relates to latex paints formulated with such foam control agents. Such latex paints typically comprise:

(1) water;
(2) a polymeric binder;
(3) a coalescing aid;
(4) a thickener;
(5) a dispersant;
(6) a foam control agent;
(7) a biocide; and
(8) a pigment.

Typically, the water, polymeric binder, and pigment represent 80 to 90 weight percent of the latex paint. The use of foam control agents within the scope of this invention result in latex paints with reduced VOCs.

BEST MODE AND OTHER EMBODIMENTS

Formulations for Foam Control Agents

1. Vegetable oils

The vegetable oil acts as a carrier for the hydrophobic silica and silicone. Typical vegetable oils which can be used in the foam control agents include rapeseed oil, canola oil, and soybean oil, preferably soybean oil, particularly refined soybean oil.

2. Hydrophobic material

The hydrophobic material is a hydrophobic material having a surface energy of from about 10 to about 40 dynes/cm$^2$, preferably from about 20 to about 30 dynes/cm$^2$. Preferably the hydrophobic material is precipitated hydrophobic silica or a hydrophobic wax having an average particle size of from 5 to 75 microns, preferably 10 to 15 microns. Precipitated hydrophobic silica is made by treating hydrophilic silica with silicone according to well known methods. Such precipitated hydrophobic silicon can be purchased from Degussa, Georgia Kaolin, and J. M. Huber.

Hydrophobic waxes include, for example, polyethylene, paraffin wax, ethylene bis stearamide, and the like. These waxes typically have a melting point greater than 100° C., preferably greater than 120° C.

3. Silicone compounds

Silicone compounds which are used in the foam control agent typically are polydimethylsiloxanes, often trimethylsilyl terminated. Generally, they are sold commercially as fluids or emulsions (which contain water and a surfactant as well as the silicone compound). Examples of commercially available products which contain silicone compounds and are effective include DC 200 sold by Dow Corning Corporation and L-45-350 sold by Union Carbide.

4. Amounts of Components in the Foam Control Agent

The weight ratio of vegetable oil to hydrophobic silica to silicone compound in the foam control agent is typically from 75:90 to 1:15 to 0.1:10, said weight ratio being based upon the total weight of the foam control agent, preferably from 85:90 to 5:10 to 0.5:2.0.

The foam control agents are prepared by mixing the precipitated hydrophobic silica with the vegetable oil by conventional mixing means, i.e. a simple blade impeller. Then the silicone compound is mixed with the mixture of precipitated hydrophobic silica and vegetable oil and the passed through a sandmill until the desired particle size is obtained. The foam control agents can be stored at temperatures of 0° C. to 40° C. for several months (typically six to twelve) before using them in latex paints. They are mixed in latex paint in amounts of 0.1 to 1.0 part by weight based upon the weight of the latex paint, preferably from 0.2 to 0.8 part by weight.

Latex Paint Formulation

Because of the variety of latex paint formulations, it is not practical to discuss these formulations in detail. Furthermore, the particular latex paint formulation is not believed to be critical to this invention. It is believed that the subject foam control agents will be useful in any latex formulation and result in the advantage of lower VOCs. Obviously, it is desirable to use a latex paint formulation which also has lower VOCs.

Typically used as the polymer binder in the latex paint are polymers based upon polymerized acrylic, vinyl acrylic, poly(vinyl acetate), styrene, and methacrylic monomers. Typically used as the dispersant in latex paints are salts of maleic anhydride/isobutylene copolymers, polymethacrylic acid, and polyacrylic acid. Thickeners typically used in latex paints are hydroxy methyl propyl cellulose, carboxymethyl cellulose, alkali swellable acrylic polymers, and associative polyurethanes. Wetting agents used in latex paints include phosphate esters, nonyl phenol ethoxylates, and other such nonionic surfactants. Pigments used include calcium carbonate, silicas, clay, titanium dioxide, and talc. Coalescent agents used include glycol ethers and phthalate esters.

The ratio of ingredients for the latex will vary widely. Typically, the amount of water in such latex paints is from 40 to 60 weight percent based upon the total weight of the latex paint. Typically, the amount of polymeric binder in such latex paints is from 15 to 25 weight percent based upon the total weight of the latex paint. Typically, the amount of pigment in such latex paints is from 15 to 25 weight percent based upon the total weight of the latex paint. These are obviously the major components of the latex paint. The other components, as a whole, are typically used in amounts of 10 to 25 weight percent. Individually, they are typically used in amounts of 1 to 5 weight percent.

ABBREVIATIONS

The following abbreviations are used in the Examples and Table which follows:
EBSA=ethylene bis stearamide, a hydrophobic wax (sold by Lonza)
FSIL=fumed silica (sold by Cabot and Degussa)
HYSIL=hydrophobic silica
SBO=refined soybean oil
 CTS=centistokes

EXAMPLES

Three foam control agents were prepared for latex paints by mixing the ingredients specified in Table I, which follows, in the amounts specified. In Example 1, the hydrophobic material was hydrophobic silica (HYSIL). In Example 2, a hydrophobic wax, ethylene bis stearamide, (EBSA) was used as the hydrophobic material. In Example 3, the hydrophobic material contained a hydrophobic silica and a hydrophobic wax.

Note that in the case of Examples 1 and 3 the [350 CTS] silicone, having a viscosity of 350 CTS, was first mixed with hydrophilic silica to make precipitated hydrophobic silica. Other than this, the foam control agents were made by first mixing the hydrophobic material (HYSIL or EBSA) with the soybean oil (SBO) with a conventional blade impeller mixer. After mixing the hydrophobic material and SBO, the 1000 CTS silicone was added and mixed. The mixture was then passed through a sandmill to achieve the desired particle size.

TABLE I (Foam Control Agent Formulations)

| EX. | SBO | EBSA | FSIL | HYSIL | 1000 CTS SILICONE | 350 CTS SILICONE |
|---|---|---|---|---|---|---|
| 1 | 88.7 | 0.0 | 0.2 | 10.6 | 0.0 | 0.5 |
| 2 | 94.2 | 5.0 | 0.0 | 0.0 | 0.3 | 0.5 |
| 3 | 93.72 | 4.54 | 0.0 | 0.96 | 0.28 | 0.5 |

All of these formulations for foam control agents were free of VOCs.

EXAMPLE 4

A generic latex paint is prepared with the foam control agent of Example 1 with the following formulation:

| Component | Function | Amount (pbw) |
|---|---|---|
| (FIRST ADDITION) | | |
| Methyl Carbitol | coalescent | 5.35 |
| TAMOL ® 731 (25%) | dispersant | 0.86 |
| TRITON ® CF-10 | wetting agent | 0.20 |
| Titanium dioxide | pigment | 5.66 |
| Agent of Example 1 | foam control | 0.33 |
| (SECOND ADDITION) | | |
| Water | diluent | 8.49 |
| Latex emulsion | binder | 60.90 |
| Texanol | coalescent | 4.47 |
| Triton GR-7M | wetting agent | 0.23 |
| Dowicil 75 | biocide | 0.15 |
| Water | diluent | 2.76 |
| Water* | diluent | 5.16 |
| Dimethylaminoethanol* | pH adjuster | 0.58 |
| Acrysol RM-5 (30%)* | thickener | 2.69 |
| Water | diluent | 2.40 |
| Agent from Example 1 | foam control | 1.00 |

In a first addition the methyl carbitol, TAMOL® 731, TRITON® CF-10, and the foam control agent of Example 1 are added to a Cowles mixer. Then titanium dioxide is added and mixed at high speeds and ground for 20 minutes. The speed of the mixer is then reduced and the remaining components are added and mixed.

In the second addition, the remainder of the components are added sequentially with mixing after the addition of each component. The components followed by an asterisk (*) are mixed together as a premix before adding.

I claim:

1. A foam control agent having no volatile organic compounds comprising:
 (a) soybean oil,
 (b) a hydrophobic wax having an average particle size of from about 5 to 75 microns, and a surface energy of from about 20 to about 30 dynes/cm$^2$, and
 (c) a polydimethylsiloxane, a substituted polydimethylsiloxane, or mixtures thereof,
wherein the weight ratio of soybean oil to hydrophobic wax to polydimethylsiloxane is about 85:5:0.5 to 90:10:2, said weight ratio being based upon the total weight of the foam control agent.

2. The foam control agent of claim 1 wherein the average particle size of the hydrophobic material is from about 10 to 15 microns.

3. The foam control agent of claim 2 wherein the hydrophobic wax is ethylene bis stearamide.

4. The foam control agent of claim 3 which contains hydrophobic silica.

* * * * *